United States Patent [19]

Strader

[11] Patent Number: 4,653,215

[45] Date of Patent: Mar. 31, 1987

[54] FISHING ROD

[76] Inventor: James W. Strader, 502 First St., NE., Havana, Fla. 32333

[21] Appl. No.: 742,750

[22] Filed: Jun. 10, 1985

[51] Int. Cl.$^4$ ............................................. A01K 87/00
[52] U.S. Cl. ........................................ 43/18.1; 43/22; 43/23
[58] Field of Search .................... 43/18.1, 18.5, 22, 23

[56] References Cited

U.S. PATENT DOCUMENTS

| | | | |
|---|---|---|---|
| 849,481 | 4/1907 | Lobit | 43/18.1 |
| 980,942 | 1/1911 | Hanson | 43/22 |
| 2,160,499 | 5/1939 | Goeb | 43/22 |
| 4,403,439 | 9/1983 | Wallace | 43/18.1 |
| 4,516,351 | 5/1985 | Highby | 43/18.1 |

Primary Examiner—Gene P. Crosby
Attorney, Agent, or Firm—Malin, Haley & McHale

[57] ABSTRACT

A fishing rod and reel system including a fulcrum gripping portion which also aligns the rod and a leverage gripping portion for providing lengthy and arcuate line castings with also an arm or body brace. The fishing pole has a long slender body with a longitudinal center line. The leverage gripping portion and a tip are on opposite ends of the fishing pole. The fulcrum gripping portion is positioned between the leverage gripping portion and the tip. A user places a first hand on the fulcrum gripping portion and the second hand on the leverage gripping portion, the first hand is held in one general position with the user's wrist allowing the fishing pole to pivot about the first hand. The second hand in contact with the leverage portion is quickly moved along an arcuate path about the first hand thereby casting line and lure or weight from the tip of the fishing rod.

5 Claims, 6 Drawing Figures

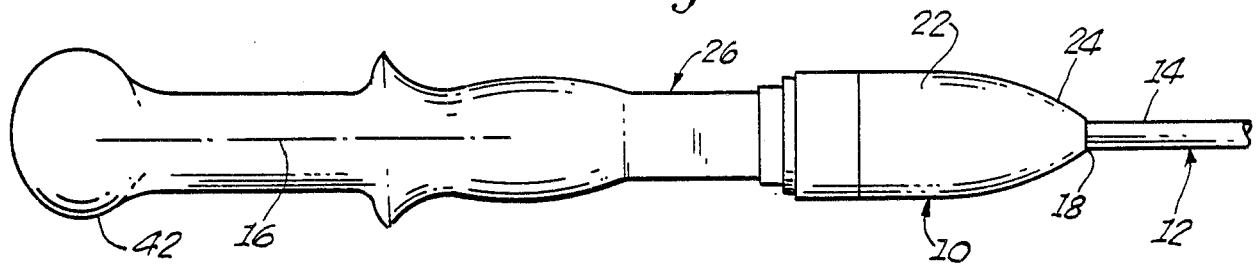
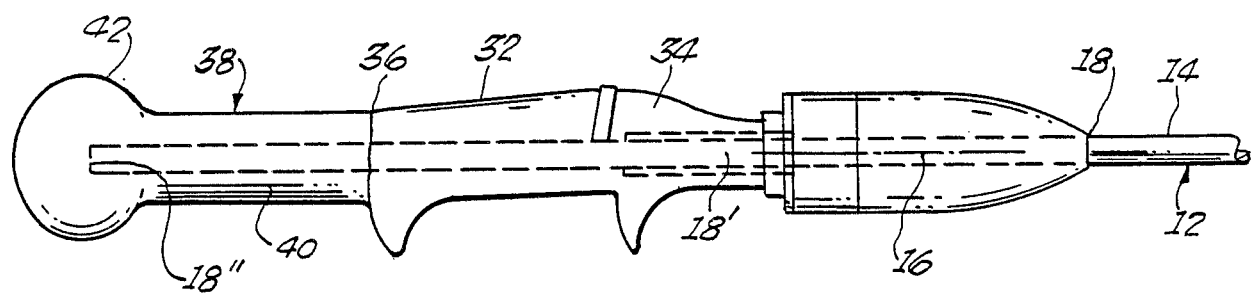
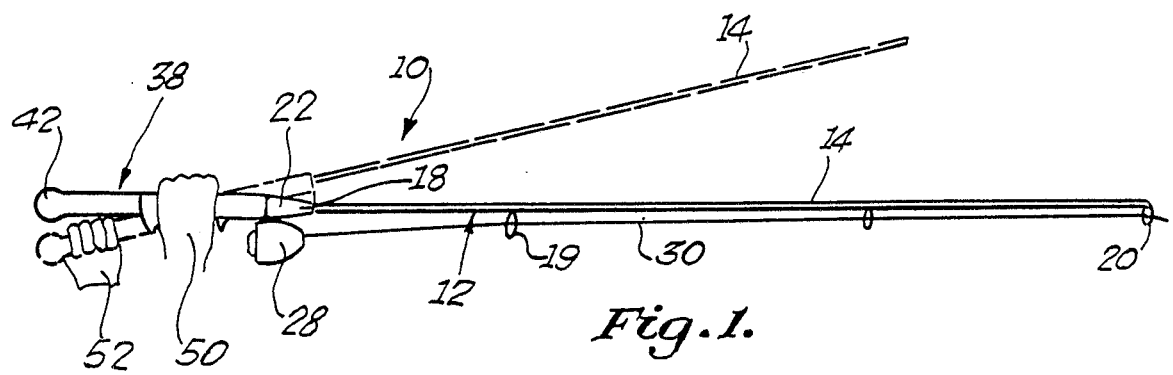

FISHING ROD

BACKGROUND OF THE INVENTION

The new and improved casting rod with a pistol grip behind the rod with an in-line leverage gripping portion rearward of the pistol grip.

In the past pistol grip casting rods ended at the base of the pistol grip. Boat poles had long base portions for bracing with a tubular hand grip on the other side of the rod. Neither of these rods can provide the function of the new and improved invention.

SUMMARY OF THE INVENTION

The fishing rod system includes a fishing pole having a long slender body with a longitudinal center line. The fishing pole has a butt end and a tip on opposite ends of the fishing pole. A reel seat portion having a forward end and a butt end, said forward end of the reel seat is connected to the butt end of the fishing pole. The butt end 18 may end in the reel seat portion 22 or the butt end 18 may run through handle. The reel seat portion holds a reel for the casting line fed through the eyes of the fishing pole. The fulcrum grasping portion is the main handle and has a forward end and a butt end. The forward end of the fulcrum grasping portion is connected to the butt end of the reel seat portion. The leverage gripping portion is the second handle and has a forward end and rear end. The forward end of the leverage gripping portion which may be longer than shown is connected to the butt end of the fulcrum grasping portion. The fishing rod system is used to cast a lure or weight on the fishing line from a reel out from the tip of the fishing pole. The first hand of the user grips the fulcrum grasping portion and allows the fishing pole to rotate about the wrist of the first hand over ninety degrees. The second hand of the user grips the leverage grasping portion to whip the tip of the fishing pole by quickly moving the butt end in an arcuate path about the first hand.

The fulcrum grasping portion is contoured with a grip design that may have finger grips so that it automatically aligns the rod with the user's arm when it is grasped. Whether the handles are constructed so that the rod blank goes clear through the reel seat or whether the rod blank stops at the reel seat, the leverage gripping portion always is in line with the rod blank with its eye at the tip of the rod and eye and reel.

It is an object of this invention to provide a new and improved casting rod that has a fulcrum grasping portion and a leverage gripping portion.

Another object of this invention is to provide a fulcrum grasping portion that aligns the rod with the arm of the user.

In accordance with these and other objects which will be apparent hereinafter, the instant invention will now be described with particular reference to the accompanying drawings.

BRIEF DESCRIPTION OF THE DRAWINGS

FIG. 1 is an illustration of the rod with one hand on the fulcrum grasping portion and the other hand on the leverage gripping portion.

FIG. 2 is a partial cross sectional view of the rod.

FIG. 3 is a partial side view of the rod.

DESCRIPTION OF THE EMBODIMENT OF THE INVENTION

Figure 4:
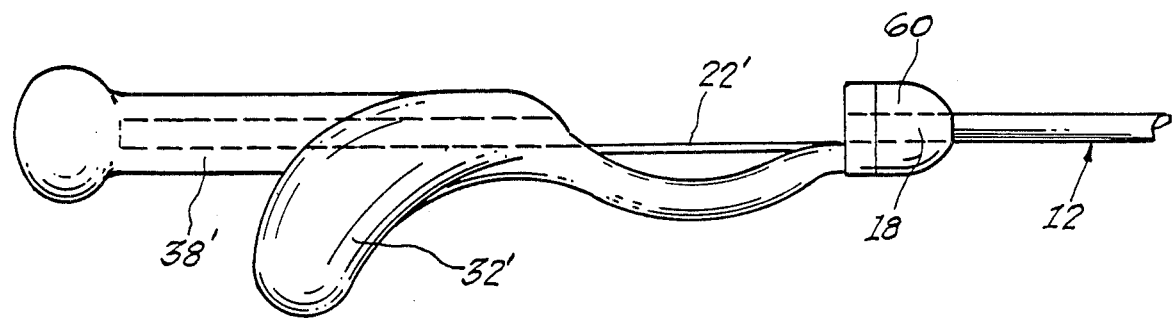
FIG. 4 is another embodiment of the rod with the rod blank terminating in the chuck device.

Referring now to the drawings FIGS. 1, 2 and 3. The fishing rod system 10 includes a fishing pole 12 having a long slender body 14 with a longitudinal center line 16. The fishing pole has a butt end 18 and a tip 20 on opposite ends of the fishing pole. A reel seat portion 22 having a forward end 24 and a butt end 26, said forward end 24 of the reel seat 22 is connected to the butt end 18 of the fishing pole 12. The butt end 18 may end at 18' in the reel seat portion 22 or the butt end 18 may run through handle to 18". The reel seat portion holds a reel 28 for the casting line 30 fed through the eyes of the fishing pole 12. The fulcrum grasping portion 32 is the main handle and has a forward end 34 and a butt end 36. The forward end of the fulcrum grasping portion 34 is connected to the butt end 26 of the reel seat portion 22. The leverage gripping portion 38 is the second handle and has a forward end 40 and rear end 42. The forward end 40 of the leverage gripping portion 38 which may be longer than shown is connected to the butt end 36 of the fulcrum grasping portion 32. The fishing rod system is used to cast a lure or weight on the fishing line from a reel 28 out from the tip 20 of the fishing pole. The first hand 50 of the user grips the fulcrum grasping portion 32 and allows the fishing pole to rotate about the wrist of the first hand 50 over ninety degrees. The second hand 52 of the user grips the leverage grasping portion 38 to whip the tip 20 of the fishing pole by quickly moving the butt end 42 in an arcuate path about the first hand 50.

The fulcrum grasping portion 32 is contoured with a grip design that may have finger grips so that it automatically aligns the rod with the user's arm when it is grasped. Whether the handles are constructed so that the rod blank 12 goes clear through the reel seat 22 or whether the rod blank 12 stops at the reel seat 22, the leverage gripping portion 32 always is in line with the rod blank 12 with its eye 20 at the tip of the rod and eye 19 and reel 28.

Referring now to FIG. 4 the butt end 18 of the rod blank 12 does not continue into reel seat 22', the fulcrum handle 32' or leverage grasping handle 38'. This method allows the handle to be manufactured alone. Any rod blank can be inserted into chuck device 60.

Figure 6:
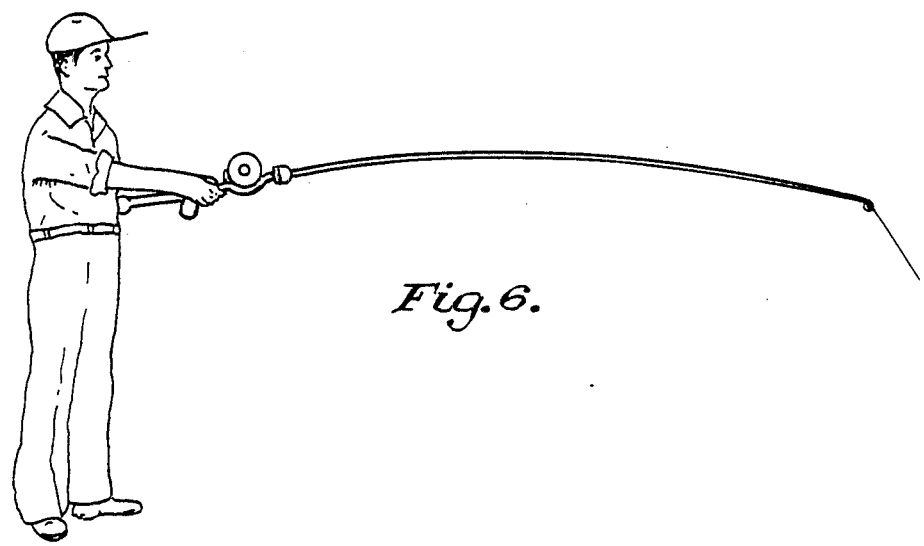
FIG. 6 is an illustration showing the use of the rod on the user's chest.
Figure 5:
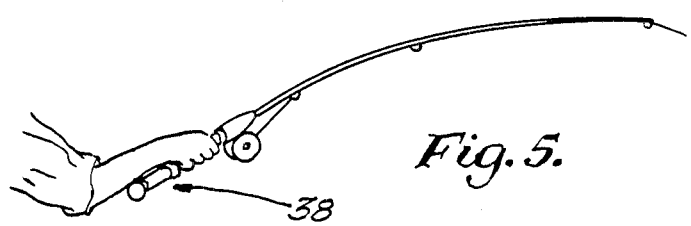
FIG. 5 is an illustration showing the use of the rod on the user's arm.

FIG. 5 shows the rod in one hand and the end ball of the rod on the user's arm. FIG. 6 shows the rod in one hand and the end on the user's chest.

What I claim is:

1. A fishing rod comprising:
   a rod having a long slender rod body with a generally straight longitudinal center line;
   said rod having a butt at one end and a tip at the opposite end;
   a reel seat means having a forward end and a butt end, at least said forward end of said reel seat being connected to the slender rod body of said fishing pole, said reel seat means holding a fishing reel;
   a main handle means having a forward end and a butt end, said forward end of said main handle means connected to said butt end of said reel seat means, said main handle means being a fulcrum grasping portion, said main handle being generally in-line with said longitudinal center line and contured with a grip design to be non-symmetrical thereabout;

second handle means having a forward and rear end portion, said forward end of said second handle means connected to said butt end of said main handle means; said reel seat means, main handle means and second handle means being contiguous sections of said fishing rod and coaxially aligned with respect to said longitudinal center line, so that a torque, whipping action is possible upon casting; said second handle means being a leverage grasping portion functioning in conjunction with said main handle means as a casting fulcrum; whereby a user can cast said fishing rod in a perpendicular direction from a position directly in front of their chest with a significant torque action to cast fishing lures and line from a reel on said reel seat means outward from said tip of said rod.

2. A fishing rod as set forth in claim 1, wherein:
said main handle means is a semi-pistol grip handle for one handed casting;
said second handle means having an enlarged end to be placed against the body of the user when fighting fish.

3. A fishing rod as set forth in claim 1, wherein:
said rod passes through said main handle means and said second handle means.

4. A fishing rod as set forth in claim 1, wherein:
said main handle means is a pistol grip means that aligns the rod with the user's arm when said pistol grip is grasped by one hand.

5. A fishing rod as set forth in claim 4, wherein:
said main handle means may be gripped by one hand as a fulcrum gripping portion;
said second handle means may be gripped by the second hand as a leverage gripping portion for arcuate movement about said fulcrum gripping portion;
said leverage grasping portion being for use as a lever when used in conjunction with said fulcrum grasping portion used as a casting fulcrum to cast fishing lure and line from a reel on said rod.

* * * * *